United States Patent [19]

Beppu

[11] Patent Number: 5,208,517
[45] Date of Patent: May 4, 1993

[54] TELEVISION SYNCHRONOUS DEFLECTION CIRCUIT

[75] Inventor: Takemi Beppu, Ora, Japan

[73] Assignee: Sanyo Electric Co., Ltd., Moriguchi, Japan

[21] Appl. No.: 829,328

[22] Filed: Feb. 3, 1992

[30] Foreign Application Priority Data

Feb. 8, 1991 [JP] Japan .................................. 3-018003

[51] Int. Cl.[5] ......................... G09G 1/04; H01J 29/70; H03L 7/00
[52] U.S. Cl. .................................... 315/364; 315/387; 358/158
[58] Field of Search ....................... 315/364, 387, 411; 358/153, 158

[56] References Cited

U.S. PATENT DOCUMENTS

| 3,956,669 | 5/1976 | Del Ciello | 315/411 |
| 4,188,568 | 2/1980 | Manners | 315/411 |
| 4,788,591 | 11/1988 | Decraemer | 358/190 |

FOREIGN PATENT DOCUMENTS 2607991 10/1988 France .

Primary Examiner—Gregory C. Issing
Attorney, Agent, or Firm—Oliff & Berridge

[57] ABSTRACT

A television synchronous deflection circuit is generally comprised of a first power supply for supplying a D.C. voltage to a horizontal AFC circuit in the horizontal deflector of a television receiver, a second power supply for smoothing the flyback pulse and for supplying a predetermined D.C. voltage to a synchronous separator, and a comparator for comparing the output voltages of the first and second power supply circuits with each other. According to a comparison signal outputted from the comparator, the operation of the horizontal AFC circuit is controlled. For example, when the output voltage of the second power supply is less than a predetermined value, operation of the horizontal AFC circuit is prohibited; and when it is larger than the predetermined value, such prohibition is released.

6 Claims, 4 Drawing Sheets

TELEVISION SYNCHRONOUS DEFLECTION CIRCUIT

BACKGROUND OF THE INVENTION

1. Field of the Invention

This invention relates to a television synchronous deflection circuit, and more specifically to such a circuit for securing a stable operation when power is initially supplied.

2. Description of the Related Art

A typical conventional television receiver is generally comprised of a tuner for selecting a desired channel signal among VHF and UHF television signals received via an antenna and for converting the selected channel signal into an intermediate-frequency signal, a picture intermediate-frequency amplifier for amplifying the picture intermediate-frequency signal, a detector for detecting the amplified picture signal outputted from the picture intermediate-frequency amplifier and for outputting a composite picture signal, a synchronous separator for separating a horizontal synchronous signal from the output signal of the detector, a horizontal deflector for generating a horizontal deflection signal which is to be applied to the horizontal deflecting coil of a cathode-ray tube and which is based on the horizontal synchronous signal separated by the synchronous separator, a color signal processing circuit for generating the necessary three primary color signals (i.e. red, green and blue) from color picture signals, as well as other signal processing circuits.

In the horizontal deflector, there is provided a horizontal AFC (Automatic Frequency Control) circuit for eliminating noise pulses in the horizontal synchronous signal outputted from the synchronous separator and for preventing any shift in horizontal synchronization.

The horizontal deflector is operable upon receipt of the D.C. current obtained from a commercial power supply (e.g., 50 Hx/100 V) by diode rectification.

Meanwhile, the circuit blocks such as the picture intermediate-frequency amplifier, detector, synchronous separator and color signal processing circuit are operable upon receipt of the D.C. current from a second power supply obtained by smoothing a high-frequency flyback pulse obtained from a flyback transformer for the generation of an anode voltage for the cathode-ray tube.

Generally, in this conventional television receiver, after the first power supply is turned on by a main switch, the second power supply is built up. But since the quantity of charging electric charges of a capacitor in the synchronous separator is small before the output voltage of the second power supply reaches a predetermined voltage, a charging current from the second power supply flows to the capacitor, and as a result, an abnormal signal (i.e. not a correct horizontal synchronous signal) would be outputted from the synchronous separator. Therefore the horizontal AFC circuit would output an abnormal frequency signal missing the safe operating region of a backward-stage horizontal drive transistor. When an abnormal signal is applied to the horizontal AFC circuit while a charging current flows to the capacitor, an abnormal control voltage will be applied to VCO in the horizontal AFC circuit. Thus, an oscillation frequency will fluctuate extensively in the horizontal AFC circuit. In such a case, the VCO may undergo harmonic oscillation (e.g., at a quadruple frequency). Then, a signal whose frequency is higher than the normal one (f=15.734 Khz) would be applied to the horizontal drive transistor. Normally, the horizontal drive transistor has its load coupled to a coil, at which a high voltage flyback pulse is generated. While the flyback pulse is present, the horizontal drive transistor remains off. In other words, turning off the horizontal drive transistor issues the flyback pulse. If a high frequency is present under this condition, the transistor which remains off would be turned on. Therefore, the horizontal drive transistor would be damaged by a large current caused by the high voltage flyback pulse.

SUMMARY OF THE INVENTION

It is therefore the object of this invention to provide a television synchronous deflection circuit which prevents any abnormal operation of a horizontal AFC circuit when the power supply of a television receiver is turned on, thus securing the safe operation of a horizontal output transistor.

According to this invention, in a television receiver comprised of a picture intermediate-frequency amplifier for amplifying a picture intermediate-frequency signal, a detector for detecting the picture intermediate-frequency signal amplified by the picture intermediate-frequency amplifier and for outputting a composite picture signal, a synchronous separator for separating a horizontal synchronous signal from the composite picture signal outputted by the detector, a horizontal deflector for generating a horizontal deflection signal which is to be applied to the horizontal deflecting coil of a cathode-ray tube and which is based on the horizontal synchronous signal separated by the synchronous separator, a horizontal AFC circuit located in the horizontal deflector for eliminating noise pulses from the horizontal synchronous signal and for processing the horizontal synchronous signal so as to be free from staggering in horizontal synchronization, and a flyback transformer for generating a high-frequency flyback pulse and an anode voltage for the cathode-ray tube, a television synchronous deflection circuit is comprised of: a first power supply circuit for supplying a D.C. voltage to the horizontal AFC circuit; a second power supply circuit for smoothing the flyback pulse and for supplying a predetermined D.C. voltage to the synchronous separator; a comparator for comparing the output voltages of the first and second power supply circuits with each other; and a control circuit for controlling the operation of the horizontal AFC circuit according to a comparison signal outputted from the comparator.

With this arrangement, when the output voltage of the second power supply for the synchronous separator is less than a predetermined value, the horizontal AFC is prohibited from operating. When it is larger than the predetermined value, such prohibition can be released to secure a normal operation when the power is supplied.

DETAILED DESCRIPTION

One embodiment of this invention will now be described with reference to the accompanying drawings.

Figure 1:
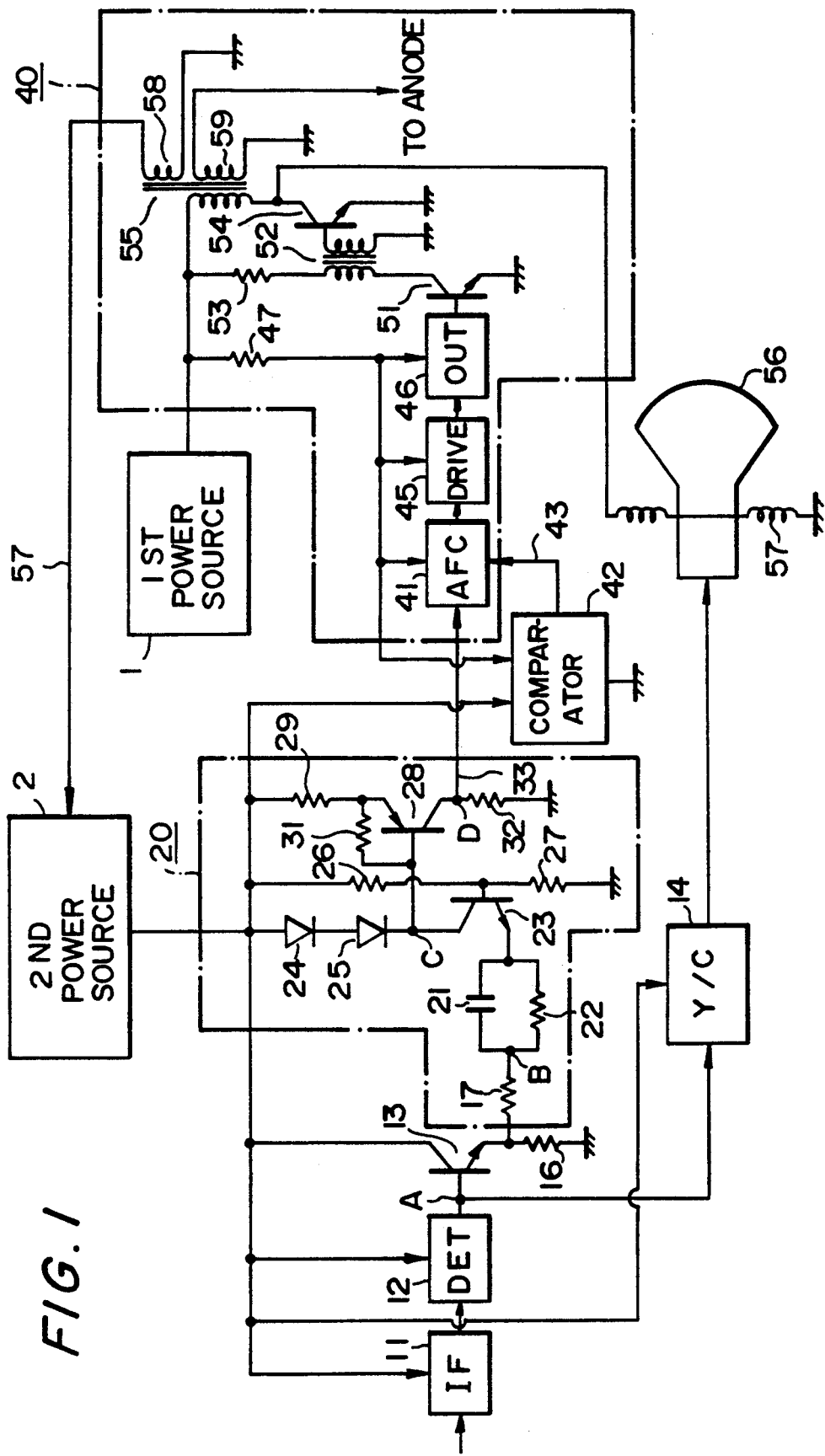
FIG. 1 is a circuit diagram showing a television synchronous deflection circuit embodying this invention and its peripheral circuits.
Figure 5A:
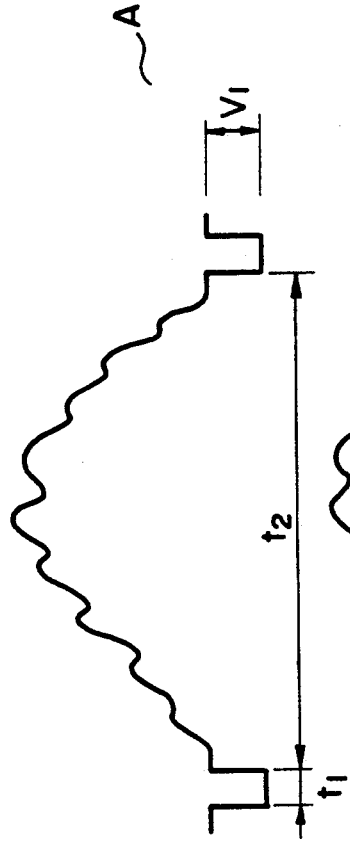
FIGS. 5(a) through 5(d) are diagrams showing waveforms of various portions of the synchronous deflection circuit.

FIG. 1 shows a television synchronous deflection circuit embodying this invention and its peripheral circuits. In FIG. 1, picture and audio intermediate-frequency signals outputted from a mixer (not shown) of a front-stage tuner are inputted to a picture intermediate-frequency amplifier (hereinafter also called IF) 11. The amplified picture signal from the IF 11 is detected by a picture detector (hereinafter also called DET) 12 and is then outputted as a composite picture signal as shown in FIG. 5(a). In FIG. 5(a), $t_1$ designates the duration of a horizontal synchronous signal, and $t_2$ designates the duration of a picture signal.

Figure 3:
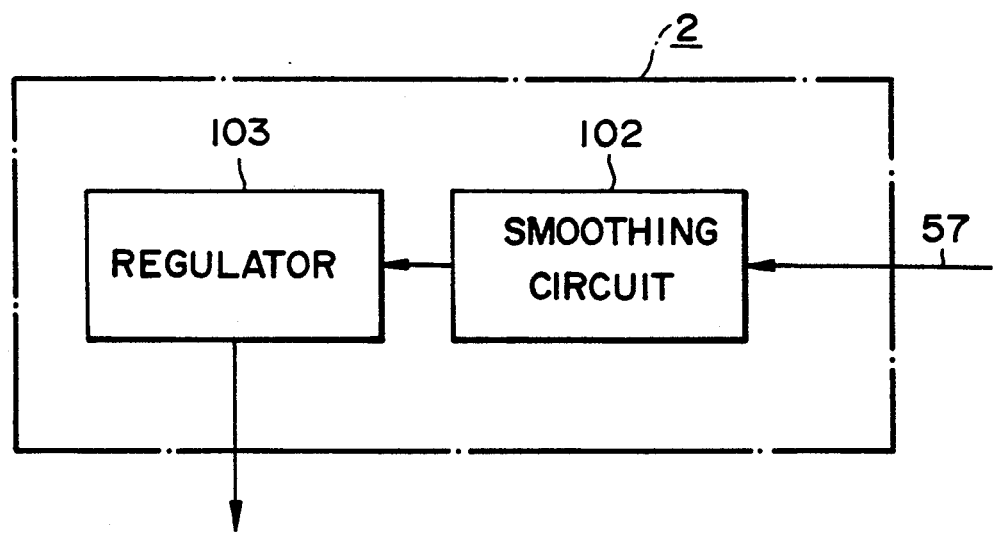
FIG. 3 is a detailed circuit diagram showing a second power supply of FIG. 1.

To the picture intermediate-frequency amplifier 11 and the picture detector 12, a D.C. voltage of about 12 V is applied from a second power supply 2. The second power supply 2, as shown in FIG. 3, includes a smoothing circuit 102 for smoothing a high-frequency flyback pulse 57 outputted from the secondary side of a flyback transformer 55 described below, and a regulator 103 for regulating the output of the smoothing circuit 102 and for outputting a D.C. voltage of about 12 V.

The composite picture signal from the picture detector 12 is inputted to the base of an n-p-n transistor 13 and to a color signal processing circuit (hereinafter also called Y/C) 14. The transistor 13 is connected at the collector to the second power supply 2 and is connected at the emitter to ground via a resistor 16 and to a subsequent-stage synchronous separator 20 via a resistor 17.

In the synchronous separator 20, a resistor 17 is connected to one end of the parallel combination of a capacitor 21 and a resistor 22, and to the other is connected the emitter of an n-p-n transistor 23. The collector of the transistor 23 is connected to diodes 24, 25 in series in this order toward the second power supply 2 and is also connected to the base of a p-n-p transistor 28. The base of the transistor 23 is connected to a junction of resistors 26, 27 interconnected in series between the second power supply 2 and ground.

The emitter of the transistor 28 is connected to the second power supply 2 via a resistor 29 and is connected to the base via a resistor 31. The collector of the transistor 28 is connected to the ground via a resistor 32.

Figure 5B:
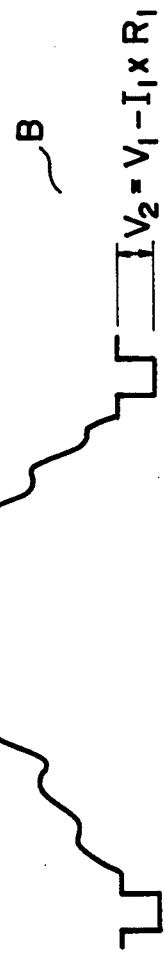
Figure 5C:
Figure 5D:

This synchronous separator 20 samples a pulse-like horizontal synchronous signal 33 such as is shown in FIG. 5(d), and outputs this sample from the collector of the transistor 28 to a subsequent-stage horizontal deflector 40.

The horizontal synchronous signal from the synchronous separator 20 is inputted to a horizontal AFC circuit 41 of the horizontal deflector 40 and is processed there so as to eliminate noise pulses of signals other than the horizontal synchronous signal and to prevent any displacement in horizontal synchronization. To the horizontal AFC circuit 41, a comparison signal 43 is inputted from a comparator 42. The comparator 42, as described below, compares the second reference voltage $V_{ref2}$ according to the output voltage of the second power supply 2 with the first reference voltage $V_{ref1}$ according to the output voltage of the first power supply 1 and outputs a comparison signal 43 of "L" level when $V_{ref2} > V_{ref1}$.

Figure 2:
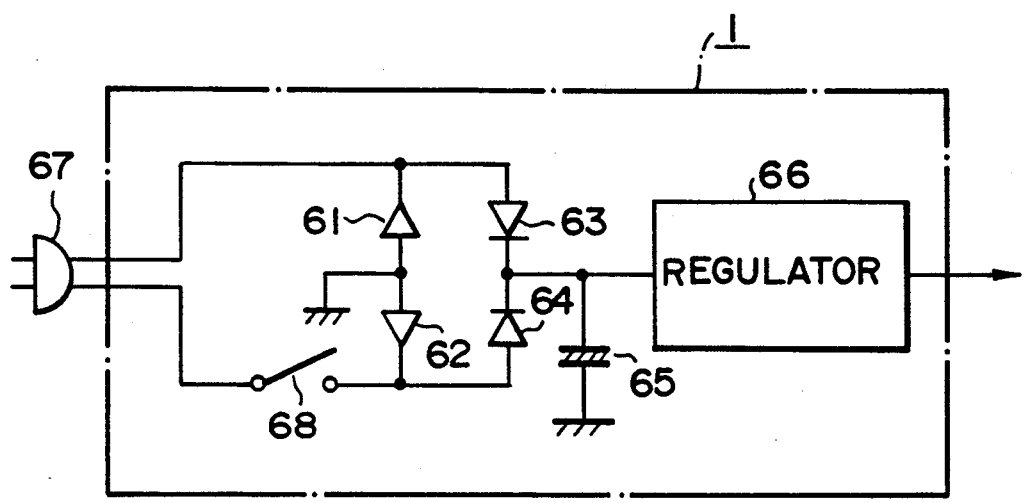
FIG. 2 is a detailed circuit diagram showing a first power supply of FIG. 1.

As shown in FIG. 2, the first power supply 1 is equipped with a main switch 68. By turning the main switch 68 on, a commercial A.C. voltage (100 V and 50 or 60 Hz) supply is inputted from a socked 67. The A.C. voltage is rectified by rectifier diodes 61–64 smoothed by capacitor 65 and by a regulator 66, whereupon the resulting voltage is outputted as a D.C. voltage of about 100 V.

The horizontal AFC circuit 41 is connected to a horizontal driving circuit 45 for amplifying a pulse voltage of the horizontal synchronous signal and for shaping a waveform of the horizontal synchronous signal, and the horizontal driving circuit 45 is connected to a horizontal output circuit 46. The output voltage from the first power supply 1 is applied to the horizontal AFC circuit 41, the horizontal driving circuit 45 and the horizontal output circuit 46, after being dropped to 7–8 V by a resistor 47.

A horizontal oscillatory output from the horizontal output circuit 46 is applied to the base of a horizontal predrive transistor 51. The collector of the horizontal predrive transistor 51 is connected to the first power supply 1 via the primary coil of a horizontal drive transformer 52 and a resistor 53, while the emitter is grounded.

The secondary coil of the horizontal drive transformer 52 is connected at one end to the base of a horizontal drive transistor 54 and at the other to ground. The collector of the horizontal drive transistor 54 is connected to the first power supply 1 via the primary coil of the flyback transformer 55 and the horizontal deflecting coil 57 of the cathode-ray tube 56, while the emitter is grounded.

At one secondary coil 58 of the flyback transformer 55, a high-frequency (about 15.7 KHz) flyback pulse 57 is generated and is then supplied to the second power supply 2. At the other secondary coil 59, a high-voltage (about 20–30 kV) anode voltage is generated and is then applied to an anode (not shown) of the cathode-ray tube 56.

Figure 4:
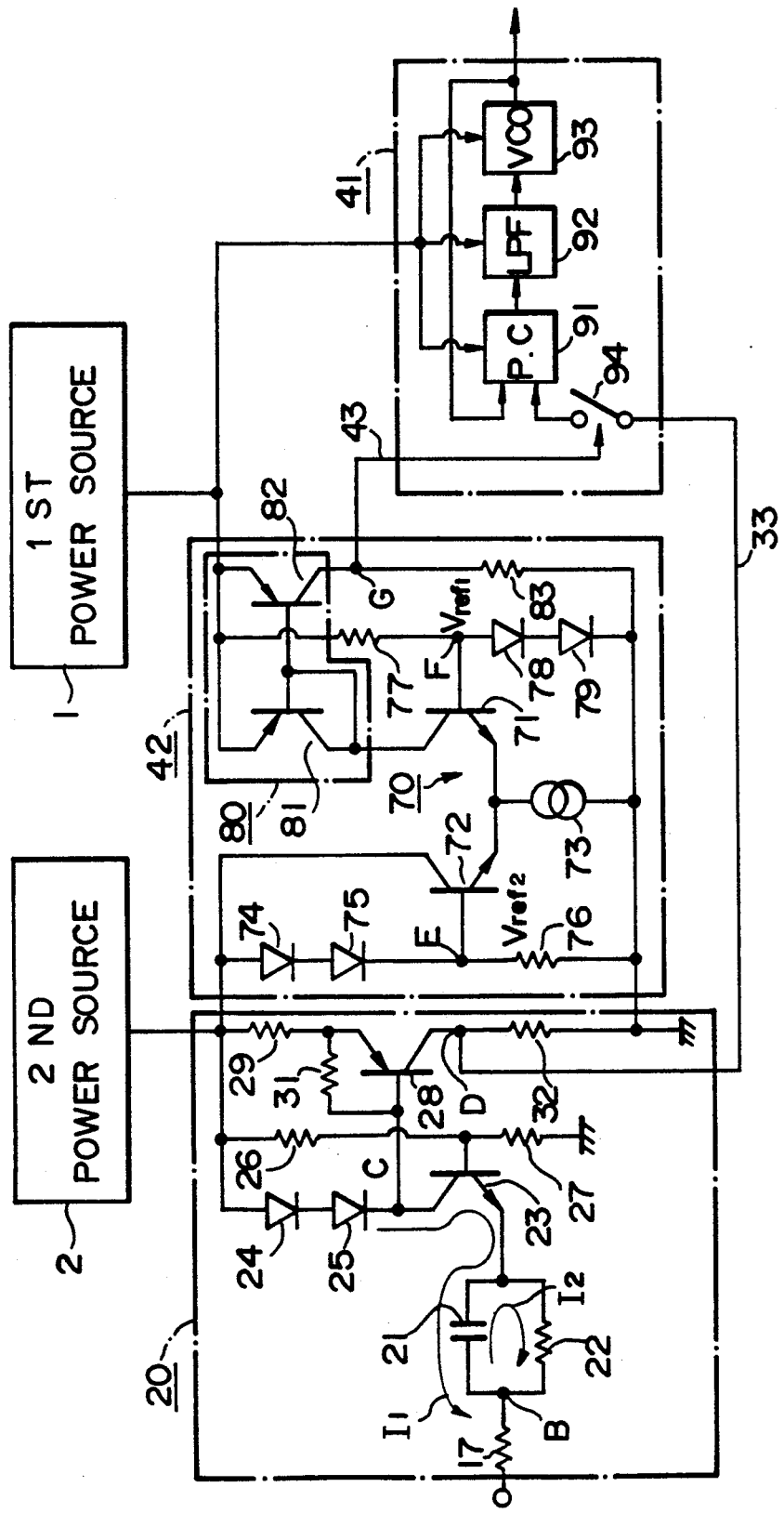
FIG. 4 is a detailed circuit diagram showing the synchronous deflection circuit of FIG. 1.

FIG. 4 is a detailed circuit diagram showing the comparator 42 and the horizontal AFC circuit 41 as well as their peripheral circuits. In FIG. 4, parts or elements similar to those of FIG. 1 are designated by like reference numerals and their description is omitted for clarity.

The comparator 42 includes a comparing circuit 70 composed of two n-p-n transistors 71, 72 connected at their emitters to a constant current power supply 73. The base of the first transistor 71 is connected to the first power supply 1 via a resistor 77 and is connected to ground via diodes 78, 79 interconnected in series in this order, and the collector is connected to a mirror circuit 80. The base of the second transistor 72 is connected through the series diodes 74, 75 to the second power supply 2 and is connected to ground via a resistor 76, while the collector is connected directly to the second power supply 2.

The mirror circuit 80 includes p-n-p transistors 81, 82 whose bases are connected to each other and whose emitters are connected to the first power supply 1. The collector of the transistor 81 is connected to its base and also to the collector of the transistor 71 of the comparing circuit 70. The collector of the transistor 82 is connected to ground via a resistor 83; from the collector of transistor 82, a comparison signal of a predetermined level is outputted so as to open and close a switch 94 located in the horizontal AFC circuit 41. The switch 94 will be closed when the comparison signal 43 is at an "L" level.

The horizontal AFC circuit 41 is equipped with a phase comparator (PC) 91 whose output side is connected to a voltage controlled oscillator (VCO) 93 via a low-pass filter (LPF) 92. These circuits are activated by the voltage applied from the first power supply 1.

To the phase comparator 91, the branched output of the voltage controlled oscillator 93 is inputted, as well as the horizontal synchronous signal 33 from the synchronous separator 20, when the switch 94 is closed. The phase comparator 91 compares the phase of the output from the voltage controlled oscillator 93 with the horizontal synchronous signal 33 and, in order to minimize the phase difference, a control voltage is supplied to the voltage controlled oscillator 93. The output from the voltage controlled oscillator 93 is supplied to the subsequent-stage horizontal driving circuit 45 (FIG. 1).

The normal operation of the synchronous deflection circuit will now be described.

Assuming that a composite picture signal having the waveform shown in FIG. 5(a) is applied to the base (point A) of the transistor 13 (FIG. 1) during the duration of $t_1$ of the horizontal synchronous signal, the potential at point B is dropped, and a current $I_1$ flows to turn on the transistor 23 on. At that time, a potential $V_2$ (FIG. 5(b)) at point B is smaller than a potential $V_1$ (FIG. 5(a)) at point A (by $I_1 \times R_1$). $R_1$ is the resistance value of the resistor 22.

When the transistor 23 is turned on, the potential at point C will be ($V_{cc} - 2V_f$) as shown in FIG. 5(c), where $V_{cc}$ represents the output voltage of the second power supply 2, and $V_f$ represents the forward voltage of the diodes 24, 25. As a result, transistor 28 is also turned on so that a current flows between its emitter and collector and so that the potential at point D will be the "H" level as shown in FIG. 5(d).

Meanwhile, during the duration of the picture signal, the potential at point B is increased so that the current $I_1$ will not flow, and so turn off the transistor 23. As a result, during the duration of $t_1$ of the horizontal synchronous signal, the electric charge accumulated in the capacitor 21 is discharged via the resistor 22 so that a current $I_2$ satisfying the following equation (1) will flow.

$$I_1 \times t_1 = I_2 \times t_2 \quad (1)$$

Therefore, during the duration of $t_2$ of the picture signal, the potential at point C will be $V_{cc}$ (as shown in FIG. 5(c)) in order to turn the transistor 28 off so that the potential at point D will be the ground level (GND).

Thus the synchronous separator 20 outputs a pulse-like horizontal synchronous signal 33 such as shown in FIG. 5(d) to the horizontal AFC circuit 41.

When the power supply of the television receiver is turned on, the synchronous deflection circuit will operate as follows: When the main switch of the first power supply 1 (FIG. 2) is closed, full wave rectification of 100 V A.C. occurs, and a D.C. voltage of about 100 V is applied to the flyback transformer 55. As a result, a flyback pulse 57 is generated at the secondary coil 58 of the flyback transformer 55 and is then supplied to the second power supply 2. Therefore there is a delay from when the first power supply 1 is activated to when the second power supply 2 is activated.

In this state, namely, after the first power supply 1 is activated and before the second power supply 2 is activated under normal conditions, the output voltage $V_{ref1}$ of the first power source 1 is applied to the base (point F) of the first transistor 71 of the comparing circuit 70, while the base (point E) of the second transistor 72 is at the ground potential. Therefore only the first transistor 71 is turned on to activate the mirror circuit 80.

As the transistor 71 is turned on, the transistor 81 of the mirror 80 is also turned on so that current will flow between its emitter and collector. Also the transistor 82 of the mirror circuit 80 is turned on so that the current through it is equal to the current flowing through both the transistor 81 and the first transistor 71. In this case, the potential at point G (namely the comparison signal 43) will be a "H" level so that the switch 94 will be opened.

When the second power supply 2 has start operating, its output voltage is increased in order to progressively increase the second reference voltage $V_{ref2}$. After the lapse of a predetermined time, a stable D.C. voltage of about 12 V is outputted from the second power source 2 and is applied to the synchronous separator 20 and various other elements.

However, as the second reference voltage $V_{ref2}$ is increased, the operation of the synchronous separator 20 will become abnormal. Thus, before $V_{ref2}$ reaches a predetermined voltage, the potential at point B is reduced so that the current $I_1$ will flow to turn the transistor 23 on. Likewise, the transistor 28 is also turned on so that the potential at point D will be a "H" level. As a result, the synchronous separator 20 is activated, irrespective of the picture signal, so that an abnormal signal will be applied to the horizontal AFC circuit 41.

However, in this state, since the switch 94 of the horizontal AFC circuit 41 is open, the abnormal signal outputted from the synchronous separator 20 is cut off so as not to be applied to the phase comparator 91. This state continues while the value of $V_{ref2}$ is smaller than the value of $V_{ref1}$.

In this state, since only one input, namely, only the output of the voltage controlled oscillator 93, is applied to the phase comparator 91, the phase comparator 91 becomes unable to compare so that its output voltage and the output of the low-pass filter 92 will be a bias voltage only. Therefore, the output from the voltage controlled oscillator 93 will be in a free-run state and hence stable.

Then, when the second reference voltage, $V_{ref2}$ has increased above the first reference voltage, $V_{ref1}$, the first transistor 71 is turned off to deactivate the mirror circuit 80 so that no current will flow through the transistor 82. As a result, the potential at point G, namely, the comparison signal 43, will be at "L" level to close the switch 94. At that time, since the output voltage of the second power supply 2 is adequately increased, the capacitor 21 has been completely charged. An appropriate horizontal synchronous signal 33 is thereby generated and is applied to the phase comparator 91 of the horizontal AFC circuit 41. From the horizontal AFC circuit 41, a signal having a normal frequency is generated so that the backward-stage horizontal predrive transistor 51 and the horizontal drive transistor 54 can be activated stably.

In this embodiment, the operation of the horizontal AFC circuit 41 is stabilized by the provision of the switch 94. Various stabilization methods may be adopted; for example, the output of the voltage controlled oscillator 93 may be adjusted to a stable oscillation form.

The switch 94 may a transistor or another device.

Using this invention, it is possible to prevent any abnormal operation of the horizontal AFC circuit when the power supply of the television receiver is switched on so that a stable operation of the horizontal output transistor can be secured. Further, to realize this, it is only necessary to add control circuits such as a comparator and a switch, which do not substantially increase the total number of elements or parts, thus avoiding an increase of manufacturing cost.

What is claimed is:

1. In a television receiver including a picture intermediate-frequency amplifier for amplifying a picture intermediate-frequency signal, a detector for detecting the picture intermediate-frequency signal amplified by the picture intermediate-frequency amplifier and for outputting a composite picture signal, a synchronous separator for separating a horizontal synchronous signal from the composite picture signal outputted by the detector, a horizontal deflector for generating a horizontal deflection signal which is to be applied to the horizontal deflecting coil of the cathode-ray tube and which is based on the horizontal synchronous signal separated by the synchronous separator, a horizontal AFC circuit located in the horizontal deflector for eliminating a noise pulse from the horizontal synchronous signal and for processing the horizontal synchronous signal so that it will be free from staggering in horizontal synchronization, a flyback transformer for generating a high-frequency flyback pulse and an anode voltage for the cathode-ray tube, a television synchronous deflection circuit comprising:
    (a) a first power supply circuit for supplying a D.C. voltage to the horizontal AFC circuit;
    (b) a second power supply circuit for smoothing the flyback pulse and for supplying a predetermined D.C. voltage to the synchronous separator;
    (c) a comparator for comparing a first reference voltage of said first power supply circuit and a second reference voltage of said second power supply circuit with each other; and
    (d) a control circuit for controlling the operation of the horizontal AFC circuit wherein said control circuit prohibits the AFC circuit from operating when the second reference voltage is below the first reference voltage, and starts the AFC circuit when the second reference voltage exceeds the first reference voltage.

2. A television synchronous deflection circuit according to claim 1, wherein said control circuit prohibits the horizontal synchronous signal from the synchronous separator from being applied to the horizontal AFC circuit so as to prevent the operation of the horizontal AFC circuit when the second reference voltage is below the first reference voltage.

3. A television synchronous deflection circuit according to claim 1, wherein said comparator includes a differential comparator and a mirror circuit.

4. A television synchronous deflection circuit according to claim 2, wherein said comparator includes a differential comparator and a mirror circuit.

5. In a television receiver including a picture intermediate-frequency amplifier for amplifying a picture intermediate-frequency signal, a detector for detecting the picture intermediate-frequency signal amplified by the picture intermediate-frequency amplifier for outputting a composite picture signal, a synchronous separator for separating a horizontal synchronous signal from the composite picture signal outputted by the detector, a horizontal deflector for generating a horizontal deflection signal which is to be applied to a horizontal deflecting coil of a cathode-ray tube and which is based on the horizontal synchronous signal separated by the synchronous separator, a horizontal AFC circuit located in the horizontal deflector for eliminating a noise pulse from the horizontal synchronous signal and for processing the horizontal synchronous signal so that it will be free from staggering in horizontal synchronization, a flyback transformer for generating a high-frequency flyback pulse and an anode voltage for the cathode-ray tube, a television synchronous deflection circuit comprising:
    (a) a first power supply circuit for supplying a D.C. voltage to the horizontal AFC circuit;
    (b) a second power supply circuit for smoothing the flyback pulse and for supplying a predetermined D.C. voltage to the synchronous separator;
    (c) a comparator for comparing a first reference voltage of said first power supply circuit and a second reference voltage of said second power supply circuit with each other; and
    (d) a control circuit for controlling the operation of the horizontal AFC circuit, wherein said control circuit locks an oscillation frequency of said horizontal AFC circuit at a preset value when the second reference voltage is below the first reference voltage, and releases said AFC circuit when the second reference voltage exceeds the first reference voltage.

6. A television synchronous deflection circuit according to claim 5, wherein said comparator includes a differential comparator and a mirror circuit.

* * * * *